Aug. 8, 1933.  H. W. INGLE  1,921,390
GLASSWARE CONVEYER
Filed Jan. 4, 1930   4 Sheets-Sheet 3
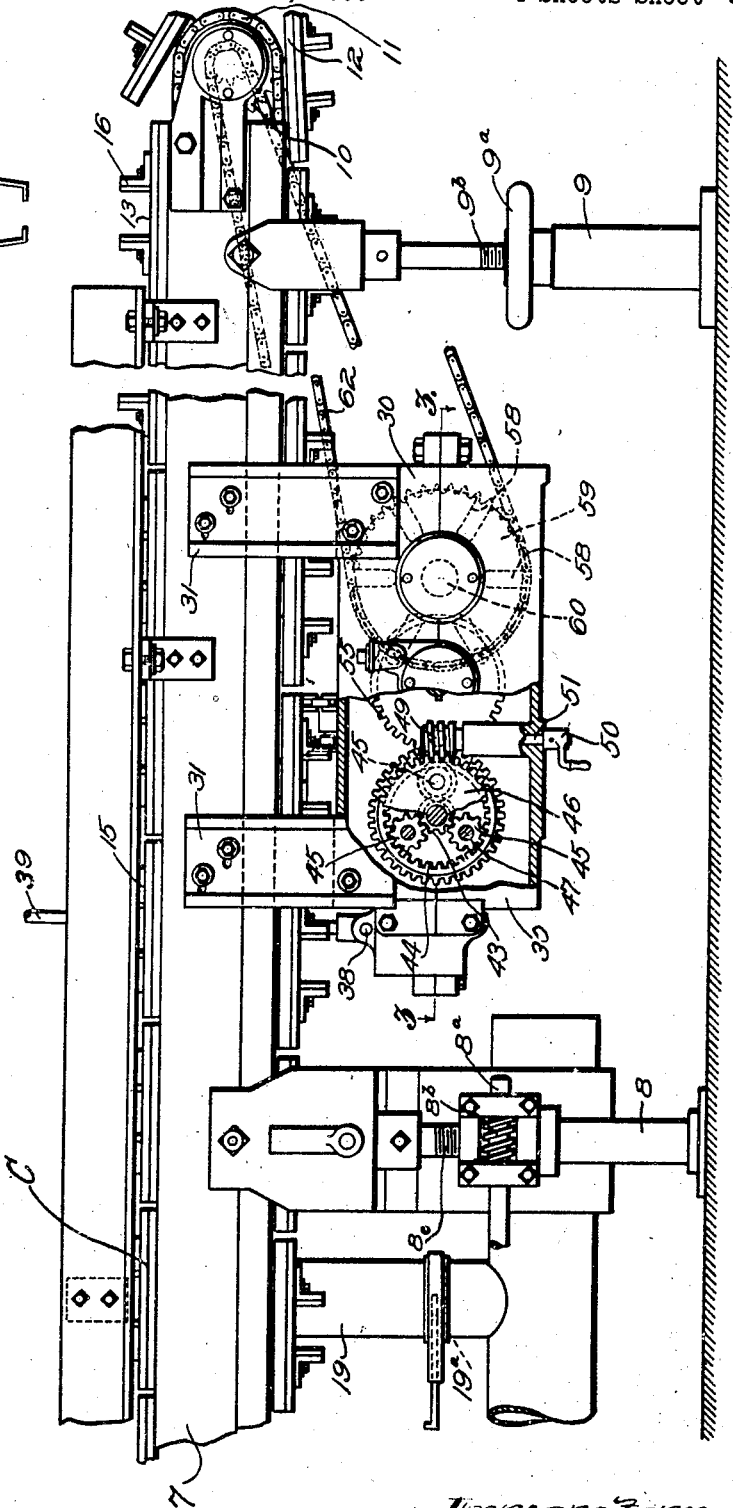
Fig. 4.
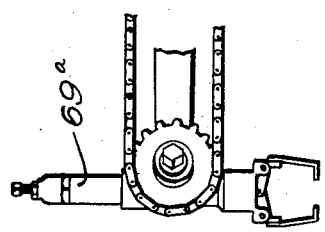
Witness:
W. B. Thayer.
Inventor:
Henry W. Ingle
by Brown & Parker
Attorneys.

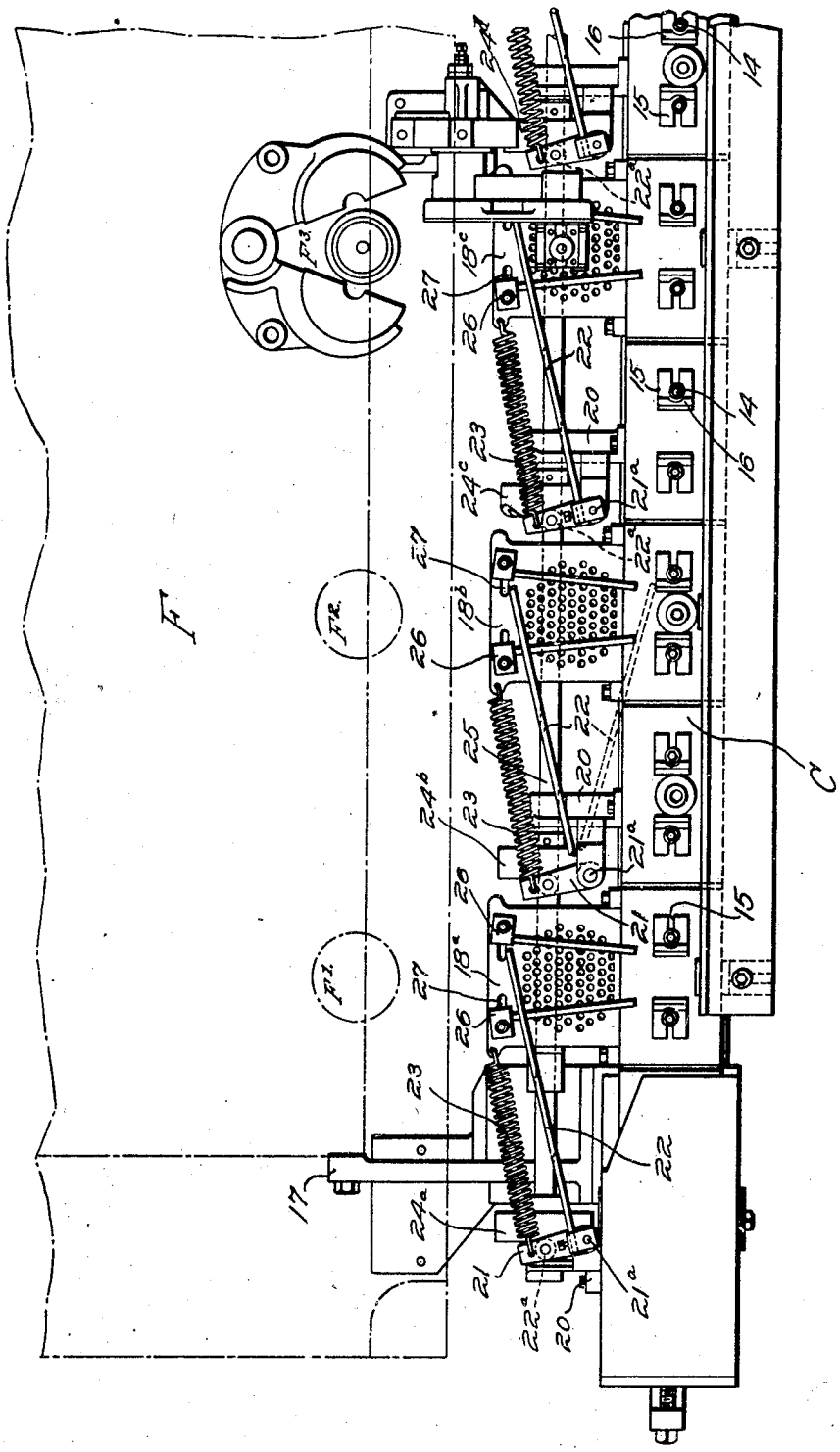

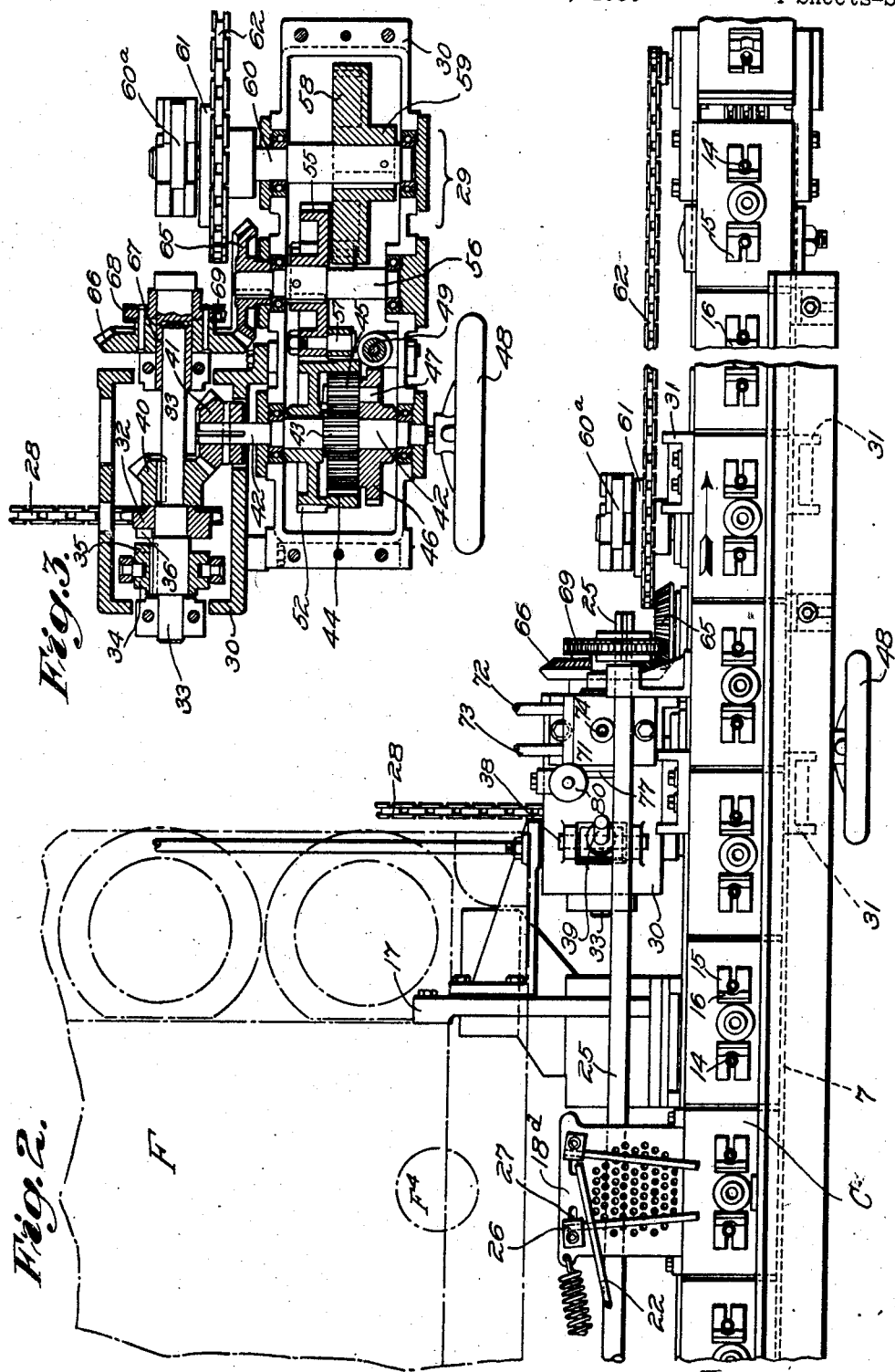

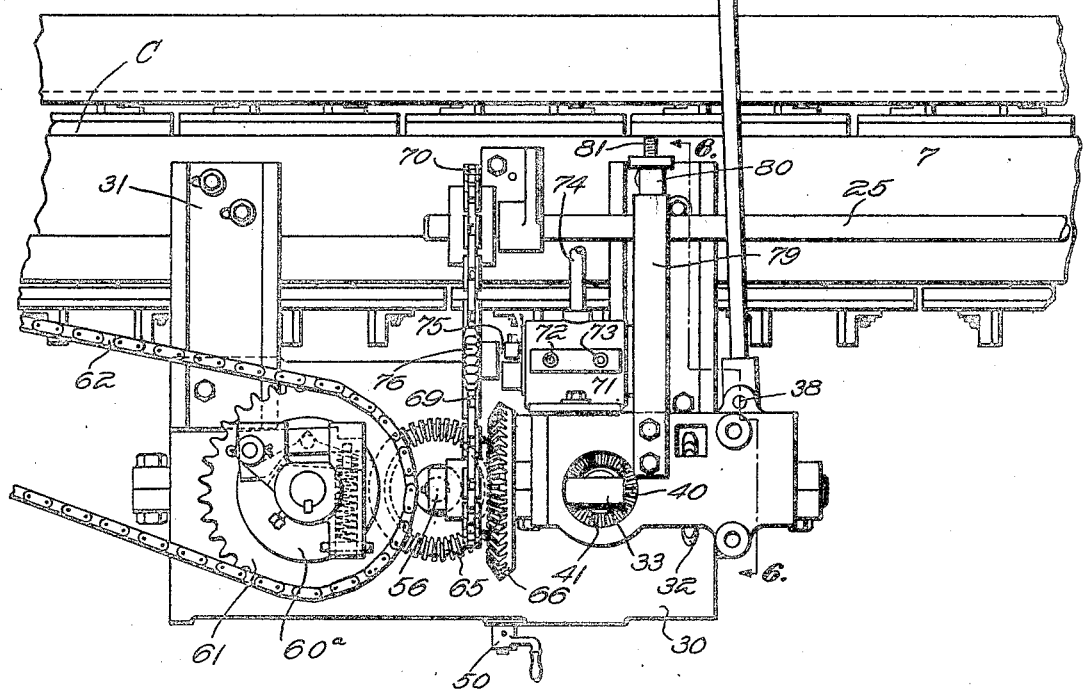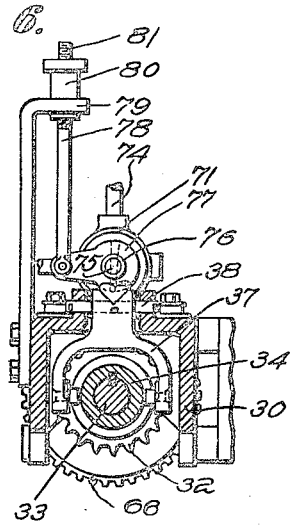

Patented Aug. 8, 1933

1,921,390

UNITED STATES PATENT OFFICE 1,921,390

GLASSWARE CONVEYER

Henry W. Ingle, West Hartford, Conn., assignor to Hartford-Empire Company, Hartford, Conn., a Corporation of Delaware Application January 4, 1930. Serial No. 418,524

16 Claims. (Cl. 49—47)

This invention relates to the art of handling articles of glassware, and more particularly to a new and improved form of glassware conveyer.

My invention is designed primarily for use with the glassware forming machine commercially known as the Hartford I. S. machine disclosed in my copending application for United States Letters Patent, Ser. No. 275,093, filed May 4, 1928, although obviously it may be used with other glassware forming machines, and particularly with apparatus in which articles of glassware are delivered at a plurality of points longitudinally of the conveyer.

Heretofore in the art it has been necessary in association with a machine of this type either to move a conveyer so rapidly that it passed all of the take-out points while one article of ware was being delivered, in order to avoid the interference of succeeding articles of ware with the article first deposited, or to shunt articles from a conveyer before they reach a position where they might interfere with articles delivered from other take-out positions. The first method is extremely disadvantageous due to the fact that considerable breakage may occur as the result of the high speed of the conveyer, and because of the difficulties in maintaining the ware upright on such a conveyer. The second method is disadvantageous because it requires the use of hand labor to remove the ware. The present invention does away with the objection of both of the methods previously used and makes possible a completely automatic operation including all operations in forming, conveying, and annealing the articles.

The invention comprises the use of a conveyer, in combination with a forming machine from which articles are taken out in numerical order from four points along a line longitudinally of a conveyer, in which glassware receptacles on the conveyer are moved intermittently in steps one-half of the distance between each of the take-out positions and in which the ware may be uniformly spaced. To accomplish such spacing the articles which are taken out from the forming machine at the first station are necessarily the last ones to be removed from the conveyer and vice versa. Because of this sequence I have devised an independently regulable cooling means at each take-out station by which the articles of ware may be cooled before they are placed upon the conveyer, by which the temperature of all ware handled by the conveyer may be controlled. Thus, I may compensate for the difference in time between the taking-out of the article farthest from the delivery end of the conveyer or stacking position and the time of the one nearest to such position, and consequently cool the one nearer to the stacking position to a greater degree than the ware farthest removed from that position.

I have also provided means for varying the length of time an article may be cooled at a given position.

An object of my invention is to provide, in combination with a forming machine of the type disclosed in my above mentioned application, a conveyer peculiarly adapted to receive ware from a plurality of stations spaced longitudinally of the conveyer in such manner that the ware will be regularly and uniformly spaced on the conveyer, and interference between ware delivered from points spaced forwardly of the conveyer with ware previously deposited from other points is avoided.

A further object of my invention is to provide, in combination with such a conveyer and shaping machine, suitable receiving and cooling members upon which ware may be received, prior to its deposit upon the conveyer and brought to a suitable temperature, such cooling on each of such members being independently regulable to compensate for differences in time of travel of articles on the conveyer, and differences in the thickness of the ware.

A still further object of my invention is to provide, in combination with the aforementioned means and a stacker adapted to remove the ware from the conveyer, suitable synchronized driving and actuating mechanism for moving the ware onto the conveyer, moving the conveyer, and removing the ware therefrom, said mechanism being provided with novel means effective to change the timing to vary the period during which the ware may be cooled prior to the delivery to the conveyer, and to simultaneously adjust the timing of the conveyer movements and the stacker to maintain suitable synchronism between the several operations.

More specifically, an object of the invention is to provide, in the combination above recited, a conveyer provided with ware-carrying members of such design and so operated that each intermittent movement of the conveyer advances any given point on the conveyer a distance equal to one-half of the distance between evenly spaced points at which ware is delivered by the takeout mechanism.

A further specific object is to provide, in the combinations above mentioned, a series of novel receiving plates provided with cooling means and individual pushers, each designed to push ware from the plate to the conveyer at suitable times, said pushers being cam actuated in variable time relation to the operation of the takeout mechanisms which place the bottles upon the receiving plates, and in constant time relationship with the movement of the conveyer and of the stacker.

Other objects will be apparent from the following description and from the drawings, in which:

Figure 1 is a plan view of the receiving end of my conveyer showing, diagrammatically, adjacent thereto a glassware forming machine;

Fig. 2 is a continuation of the view in Fig. 1, showing the delivering end of the device and the actuating means therefor;

Fig. 3 is a horizontal section of the actuating means on the lines 3—3 of Fig. 4, certain parts thereof, however, being shown in plan;

Fig. 4 is a longitudinal view principally in elevation of the delivery end of the device, partially cut away to show portions of the actuating mechanism, as viewed from the right hand side of the conveyer facing toward the delivery end;

Fig. 5 is a longitudinal view principally in elevation of the actuating mechanism as viewed from the side opposite that shown in Fig. 4; and Fig. 6 is a section taken on lines 6—6 of Fig. 5.

Referring particularly to Figs. 1 and 2, a conveyer C is shown located adjacent to a forming machine F. The conveyer comprises a frame which is vertically adjustable and which carries thereon an intermittently moving endless conveyer belt and actuating mechanism therefor. A frame member 7 is mounted on three supports, two of which (Fig. 4) are designated as 8 and 9. A support identical with that designated as 8 carries the front end of the frame 7, but is not shown. The support 9 is built in two parts, the upper part of which is screw-threaded at one end as illustrated at 9b and is vertically adjustable with respect to the lower part by means of a threaded wheel 9a, as shown in Fig. 4. The support 8 and the support not shown, identical with the support 8, are adapted to be adjusted simultaneously vertically by means of a shaft 8a and worms 8b mounted thereon which mesh with internally threaded worm wheels in which are mounted threaded posts as illustrated at 8c. The forward end of the shaft 8a carries a handle (not shown) by which it may be rotated to raise or lower both of the forward mountings of the conveyer at one time.

A sprocket wheel is mounted at each end of the frame, the wheel on the rear end of the frame only being shown. The wheel illustrated, 10, acts as a drive for an endless conveyer belt 11. The sprocket wheel not shown is similar to that illustrated, except that it has no driving function or means.

Mounted on the endless conveyer belt 11 are a plurality of metal plates 12 which preferably bear on their glass contacting surface a covering of asbestos or similar heat resisting material 13. On each of the plates, mounted by means of bolts 14 in slots 15, are two ware positioning members 16 which are adjustable thereon to provide proper spacing therebetween for ware of various sizes. These members together form a glassware receptacle for holding the ware in position as it is moved by the conveyer.

In the preferred embodiment of my invention herein described, the forming machine comprises four finishing molds F¹, F², F³, and F⁴. The conveyer is positively located with respect to the forming machine by means of brackets 17 which are bolted to the frames of the forming machine and of the conveyer. Bolted to the frame of the conveyer are glassware receiving plates 18a, 18b, 18c, and 18d, one being provided adjacent to each finishing mold. In operation, the ware is removed from the finishing mold and placed upon the plates 18a, 18b, 18c, and 18d by any preferred form of take-out device, as for example that described in my aforesaid application. The plates 18a to 18d are perforated and each is connected to a source of air under pressure by pipes 19, by which the ware is cooled as it rests on the plates. A gate 19a is located in each of the pipes 19 and is regulable to control the amount of air passing through each of the pipes.

Mounted on the frame 7 of the conveyer are brackets 20 upon which are mounted levers 21 adapted to oscillate about a pivot 21a. Upon one end of the lever are mounted rods 22 which extend from the lever to and partially across the plates 18a to 18d respectively. Mounted on the forward ends of the levers 21 are cam rollers 22a and springs 23 which tend to pull the levers toward the plates 18a to 18d respectively and, due to the location of the rods 22, tends to move the rods across the plates in the direction of the conveyer belt. Cams 24a, 24b, 24c and 24d cooperating respectively with the rollers 22a are mounted on a shaft 25 which is carried by bearings on the frame 7, and which is rotated in the manner hereinafter described.

When the cam roller 22a at the extreme left (Fig. 1) comes in contact with a depression in the cam 24a, the associated spring 23 draws one end of the corresponding lever 21 toward the plate 18a and causes the rod 22 mounted on the other end of the lever to move across the plate and toward the conveyer belt to the position as shown in dotted lines at plate 18b (Fig. 1), thus moving from the plate the article of glassware previously placed thereon by the takeout from the forming machine. The four cams 24a to 24d are mounted upon the shaft 25 with their depressed portions angularly 90° apart, and thus operate in successive order as they are rotated. Two guides 26 are mounted by means of bolts in slots 27 in each of the plates 18a, 18b, 18c, and 18d, and are adjustable to direct articles of glassware toward the proper position upon the conveyer belt.

In operation, glassware is finished by the forming machine in the following order of the finishing molds: F¹, F², F³, F⁴. The articles of glassware are removed from the finishing molds to the plates adjacent thereto as they are finished. The cams 24a, 24b, 24c, and 24d are therefore located on the shaft with their non-concentric portion 90° apart so as to remove articles of glassware successively from the plates 18a, 18b, 18c, and 18d.

The conveyer is driven, preferably, from the main drive shaft of the forming machine, by means of a drive chain 28 which operatively connects the forming machine with a gear mechanism designated generally as 29 carried in a housing 30 which is hung on brackets 31 from the conveyer frame 7.

The drive chain 28 is mounted over a sprocket idler 32 (Figs. 3 and 6) which is rotatably mounted on a shaft 33. This shaft, as well as other shafts forming a part of the gear mechanism, is mounted in bearings formed in the housing 30.

A clutch mechanism comprises a collar 34 keyed slidingly to the shaft 33 adjacent to the sprocket wheel 32. The collar has a projection 35 which meshes with a slot 36 in the sprocket idler 32. Connected to move the collar 34 longitudinally of the shaft 33 is a yoke 37, which is pivoted at 38 on a portion of the housing 30, and on which is mounted a handle 39 which extends above the level of the conveyer for easy access. By moving the handle 39 toward the delivery end of the conveyer, the sprocket idler 32 is severed from operative connection with the remainder of the gear mechanism 29, and by moving the handle in the opposite direction the drive is operatively connected therewith, and at such times imparts a rotative movement to the shaft 33.

Keyed to the shaft 33 upon the side of the sprocket idler 32 opposite the clutch mechanism is a bevel gear 40 which meshes with a bevel gear 41 fixedly mounted on a shaft 42 mounted in bearings in the housing 30 at right angles to the shaft 33. A rotative movement is thus imparted to the shaft 42 on which is keyed a gear wheel 43, which drives a gear wheel 44 through a planetary gearing consisting of three gear wheels 45, which are rotatably mounted on a worm wheel 46 by means of stud shafts 47. The worm wheel 46 is rotatably mounted on the shaft 42 and a worm 49 is operatively connected therewith. This worm is adapted to be turned by a handle 50 mounted on the shaft 51 thereof and which extends below the housing 30. Gear teeth 52 on the outer surface of the gear wheel 44 mesh with a gear wheel 55, which is keyed to a shaft 56 mounted in the housing 30 parallel to the shaft 42

Mounted on the gear wheel 55 are three driving pins, generally designated as 57, which mesh with slots 58 in a star wheel 59, and which impart rotative movement thereto and through it to a shaft 60 to which it is keyed and which is mounted parallel to the shafts 56 and 42. Keyed to the shaft 60 outside the housing is a spring pressed pin mechanism, generally designated as 60a which is adapted to drive a slotted sprocket wheel 61 rotatably mounted on the shaft 60. The mechanism 61 is in effect a safety means for attaching the wheel 61 to its shaft 60, the connection being broken in an overload sufficient to compress the spring.

Through the above described connections, an intermittent rotative movement is transmitted from the forming machine or other prime mover to the sprocket wheel 61. By turning the handle 50, the worm is rotated, thus causing the worm wheel 46 to rotate and carry with it the three gear wheels 45, and by these means the operator is enabled to vary the phase relationship of the driving mechanism to the driven mechanism and change the relative timing of the two.

The Geneva drive above described is characterized by the fact that as soon as one pin ceases to move the driven wheel, another pin immediately takes up the drive, and consequently the movement transmitted to the conveyer is one of deceleration followed by acceleration with no period of dwell between the two. This drive is more fully described in the patent to George E. Rowe, No. 1,802,923, granted April 28, 1931.

Fixedly connected to the outer end of the shaft 42 is a hand wheel 48 by means of which the operator of the machine can turn the shaft 42 and thus move the conveyer when the clutch is disengaged.

The mechanism for driving the shaft 25 comprises a bevel pinion 65 keyed to the shaft 56 which meshes with a bevel gear 66 which in turn is rotatably mounted on a sleeve 67, the inner portion of which sleeve forms a forward bearing for the shaft 33 and which itself is a portion of the housing 30. Fixedly connected to the bevel gear 66 and similarly mounted about the sleeve 67 is a sprocket wheel 68 by which a drive chain 69 drives a sprocket wheel 70, which is keyed to one end of the shaft 25, on which the cams 24a, 24b, 24c, and 24d are mounted. It is obvious that the timing of the shaft 25 and hence the cams 24a, 24b, 24c, and 24d relative to that of the conveyer is constant since there is no means for varying the relationship between the movement of the shaft 25 and the star wheel 59, and that such timing is variable relative to that of the forming machine.

A glassware stacking mechanism diagrammatically indicated at 69a is associated with the conveyer and is adapted to remove articles of glassware therefrom and place them upon the belt of a lehr. The stacking mechanism is preferably of the type described in the copending application of E. H. Lorenz, Ser. No. 204,875, which was filed July 11, 1927, now Patent No. 1,878,156, granted September 20, 1932. In general, this stacker comprises a pair of arms carrying tong mechanisms which are alternately moved from a ware-receiving position over the conveyer to a ware delivery position in a lehr. These arms are driven by suitable mechanical means through an air controlled clutch mechanism. This clutch mechanism consists primarily of pawls carried by the arms associated with driven toothed ratchet wheels. With each of the pawls is associated a pair of pins or plungers mounted on pistons operated in one direction by a spring and in the opposite direction by air pressure. These pins at suitable times break the driving connection and thus time the operation of the arms. The operation of the pins and hence of the arms is controlled by suitable air valves, as for example, that shown at 71.

The valves 71 may be of any suitable rotary type. Communicating with the air valve 71 are air ports 72 and 73 and a pipe 74 leading from a source of air under constant pressure. On a shaft 75 of the valve is mounted a sprocket wheel 76 which is adapted to be engaged by the drive chain 69 and which is rotated thereby. By the rotation of the shaft air is admitted from the pipe 74 alternately to the air ports 72 and 73 and thence to the stacker mechanism. About the other end of the shaft 75 is a sleeve 76 (Fig. 6) to which is keyed a member 77, which in turn is pivoted to a rod 78 which rises vertically through an arm 79 connected to the casing 30 and upon which rod is a thumb nut 80 adapted to be moved about a screw thread 81 cut on the rod 78. By adjusting the rod 78 either upwardly or downwardly through the nut 80, the sleeve 76 can be moved relative to the shaft and the admission of air to the ports 72 and 73 governed accordingly. Since the drive chain 69 controls the operation of the cam shaft 25, it is obvious that any adjustment in the timing of the cam shaft transmitted through the chain 69 will cause a corresponding change in the timing of the stacker timing mechanism relative to the operation of the remaining parts of the apparatus, and since, as previously described, the timing of the conveyer and the cam shaft 25 are always the same, it follows that the timing of the air valve must also correspond to the movement of the conveyer. Thus when once properly timed by means of the thumb bolt 80, the stacker timing mechanism will always be constantly timed relative to the movement of the conveyer and any variation in the timing of the conveyer will immediately be transmitted to the stacker timing device.

A machine of the type of the Hartford I. S. machine, heretofore referred to, and for use with which the apparatus above described is particularly adapted, comprises a plurality of individually controlled units, each unit comprising a blank mold, neck ring and blow mold, a takeout mechanism, and a timer carrying a plurality of control elements through which the various steps in the cycle of forming and taking out an article of glassware may be regulated at will. Thus the several sections of such a machine are capable of making a plurality of different types of bottles at the same time, and applying, to the manufacture of each of these bottles, the cycle best suited for the particular ware. Thus, within limits, the cycle of one unit may be lengthened or shortened with respect to other units, and the phase relation between the operation of the several takeouts may be varied at will. Thus in the operation of such a machine, it may well occur that the ware formed and taken out at the station $F^4$ may result from a shorter cycle than the ware formed and taken out at station $F^1$, and hence, without different regulation of the cooling air applied to the plates $18a$ and $18d$, the desired cooling effects may be obtained purely through the difference in time of exposure of the bottles on their associated cooling plates. However, as such regulation of the time of takeout cannot generally be made for the sole purpose of controlling the time the articles stand on the cooling plates, I have provided other means for controlling the character of the cooling of bottles upon the plates, namely, the air regulating means $19a$, and I have also provided means for regulating the time of cooling of all the bottles in the series by means of the planetary gearing controlled by the handle 50. By the use of some or all of these means, I am able to accurately regulate the cooling effect obtained on the plates $18a$, $18b$, $18c$, and $18d$ not only to compensate for differences in the character of the ware, but also to compensate for the differences in time of travel of the ware from a shaping machine to the stacking device, while at all times maintaining the desired synchronism between the movements of the conveyer, the stacker and the pusher rods 22.

Assuming that all sections of the machine are working the same way, that the takeouts of the machine F operate at the end of equal cycles, that their operations are spaced apart 90° and are in the order $F^1$, $F^2$, $F^3$, and $F^4$, I regulate the quantity of air supplied through the several gates or valves 19, so that successively increasing quantities of air are supplied to the sections $F^1$, $F^2$, $F^3$, and $F^4$, the several increases in the quantity supplied being selected to exactly compensate for the differences in cooling resulting from differences in time required to carry the several articles of ware from the machine to the stacker to thus equalize the cooling. The conveyer moves in half steps as described, and so that a ware receptacle arrives opposite each plate 18 at the proper instant and at minimum speed, the cams on the shaft 25 are so set that the rods 22 are operated in the order $24a$, $24b$, $24c$, and $24d$, and at times properly related with the arrival of ware receptacles of the conveyer, that the ware will be moved onto the plate and between the guides 16 at the proper time. In the continued operation of the apparatus, ware is thus delivered to each of the ware carrying plates in a succession of series in which the bottles are arranged in the order from right to left (looking at Fig. 2). This ware successively arrives at the stacker receiving station indicated at Fig. 4, at which station, when the conveyer is travelling at its minimum or substantially zero speed, an arm of the stacker moves into position and grips the ware by its neck, lifts it from the conveyer, and moves it to a delivery station which may be on a lehr belt.

As above described, the conveyer, the pusher rods 22 and the stacker operate in a constant relative time relation and in suitable and adjustable phase relation with the operation of the machine. This phase relation may be changed while the apparatus is in operation, (while the effect of the adjustment can be observed) through the operation of the handle 50 which, as above pointed out, varies the time relation of the three operations as a whole with respect to the shaft 33 which is driven from and in constant time relation with the machine F.

It is obvious that many variations may be made in the form of the above described embodiment of my invention without departing from the scope thereof as set out in the following claims:

I claim:

1. In combination with a glassware forming machine having a plurality of take-out points, a glassware handling device comprising a conveyer, a plurality of glassware receiving platforms adjacent the conveyer, each adapted to receive ware directly from the machine at one of said take-out points, means for cooling the glassware on the platforms, and means for moving the glassware from the platforms to the conveyer.

2. In combination with a glassware forming machine having a plurality of take-out points, a glassware handling device comprising a conveyer, a plurality of glassware receiving platforms adjacent the conveyer, each adapted to receive ware directly from the machine at one of said take-out points, means for moving the glassware from the platforms to the conveyer, and means for varying the time of dwell of the articles of glassware upon the platforms.

3. A glassware handling device comprising a conveyer, means for intermittently moving the conveyer, a plurality of glassware receiving platforms arranged adjacent to the conveyer and spaced longitudinally of the conveyer, and means for moving the glassware from the platforms to the conveyer between periods of movement thereof.

4. A glassware handling device comprising a conveyer, means for moving the conveyer, a plurality of glassware receiving platforms arranged adjacent to the conveyer and spaced longitudinally of the conveyer, means for moving the glassware from the platforms to the conveyer at spaced intervals of time, and means for varying the time of dwell of the articles upon the platforms.

5. A glassware handling device comprising a conveyer, means for moving the conveyer, a plurality of glassware receiving platforms arranged adjacent the conveyer and at spaced intervals longitudinally thereof, means associated with each platform for cooling the ware, means for regulating the cooling effect of said last named means, and means for moving the ware from the platform to the conveyer at successive intervals of time.

6. In combination with a glassware forming machine including takeout mechanism and driving means therefor, automatic ware handling apparatus comprising a conveyer, a receiving platform adjacent the conveyer adapted to receive ware from the machine takeout mechanism, means for moving the ware from the platform to the conveyer, a stacker associated with the conveyer at a point spaced from the machine and adapted to remove ware from the conveyer, means for driving the conveyer, stacker and ware moving means in constant time relationship with respect to one another and in variable time relation to the operation of the forming machine, and means for varying the last named relation while the apparatus is operating.

7. The combination with a glassware forming machine including takeout mechanism and driving means therefor, of automatic ware handling apparatus comprising a conveyer, a plurality of receiving platforms adjacent the conveyer and spaced longitudinally of the conveyer and adapted to receive ware from the machine takeout mechanism, means for moving the ware from the platforms to the conveyer, a stacker associated with the conveyer at a point spaced from the machine and adapted to remove ware from the conveyer, means for driving the conveyer, stacker and ware moving means in constant time relationship and in variable time relation to the operation of the forming machine, and means for varying the last named relation while the apparatus is operating.

8. In combination with a glassware forming machine including takeout mechanism and a driving means therefor, automatic ware handling apparatus comprising a conveyer, a receiving platform adjacent the conveyer adapted to receive ware from the machine takeout mechanism, means for regulably cooling the ware on said platform, means for moving the ware from the platform to the conveyer, means for driving the conveyer and ware moving means in constant time relationship with respect to one another and in variable time relation with the operation of the forming machine, and means for varying the last named relation while the apparatus is operating.

9. In combination with a glassware forming machine including takeout mechanism and a driving means therefor, automatic ware handling apparatus comprising a conveyer, a plurality of receiving platforms adjacent to and spaced longitudinally of the conveyer adapted to receive ware from the machine takeout mechanism, means for regulably cooling the ware on said platforms, means for moving the ware from the platforms to the conveyer, means for driving the conveyer and ware moving means in constant time relationship and in variable time relation with the operation of the forming machine, and means for varying the last named relation while the apparatus is operating.

10. A glassware handling device comprising an endless conveyer belt, glassware receptacles on the belt, glassware receiving platforms adjacent the conveyer and located at varying distances from the point of delivery of the conveyer, means to move glassware to the conveyer from the platform farthest from the delivery end, similar means to move glassware to the conveyer from the remaining platforms in the order of their distance from the delivery end of the conveyer, and means to operate the conveyer, whereby in each of a given series of operations the article of glassware placed upon the conveyer farthest from the delivery point is the last to be delivered at such point.

11. A glassware handling device comprising a conveyer, glassware receiving platforms, means to move articles of glassware from the platforms to the conveyer, means to move articles from the conveyer, and means to move the conveyer, the several means being so arranged and timed that the first article of glassware placed upon the conveyer will be the last article to be removed and the last article of glassware placed upon the conveyer will be the first article to be removed.

12. In combination with a glassware forming machine and a stacker, a glassware handling device comprising a conveyer, glassware receiving platforms mounted adjacent the conveyer adapted to receive articles of glassware from the forming machine, means to move articles of glassware from the platforms to the conveyer, means actuating said last named means, the conveyer and a timing device for the stacker, and means to vary the period of dwell of articles of glassware upon the platforms and concomitantly therewith the movement of the conveyer and of the stacker.

13. In combination with a glassware forming machine having a plurality of take-out points, a glassware conveyer comprising a frame, a conveyer belt supported thereby, a plurality of platforms on the frame, each adapted to receive ware directly from the machine at one of said take-out points, means to move articles of glassware from the platforms to the conveyer, means to move the conveyer, and a common driving means for the two last named means.

14. A glassware conveyer comprising a frame, a conveyer belt supported thereby, a plurality of glassware receiving platforms adjacent the conveyer, glassware receptacles on the conveyer belt, means to move each of the glassware receptacles in steps of one-half of the distance between each of the platforms, and means for depositing an article of glassware in a glassware receptacle at each movement of the conveyer belt.

15. A glassware conveyer comprising a frame, a conveyer belt supported thereon, a plurality of platforms adjacent the conveyer adapted to successively receive newly formed glassware, means for moving the ware from platforms at the end of equal periods of rest thereon, means to apply a cooling medium through each of the platforms, and means to vary the amount of cooling medium applied through each of the platforms, whereby articles of glassware placed upon the platforms may be cooled different amounts in the same length of time.

16. In combination with a glassware forming machine having a plurality of take-out stations, means for automatically taking finished ware out of molds at said stations, a ware handling mechanism including a conveyer mounted to pass all of said take-out stations, individual receiving and cooling plates adjacent each take-out station adapted to receive glassware from said take-out means and to cool the ware preparatory to movement thereof onto the conveyer, means for supplying cooling air to the plates, means for individually regulating the amount of cooling air supplied to each plate, and means individual to each plate for moving the ware from the plate onto the conveyer after said ware has been cooled to the desired extent.

HENRY W. INGLE.